Patented Apr. 12, 1949

2,467,234

UNITED STATES PATENT OFFICE 2,467,234

PREPARATION OF OLEFINE POLYMERS

Donald Edward Sargent and William Edward Hanford, Easton, Pa., assignors to E. I. du Pont de Nemours & Company, Wilmington, Del., a corporation of Delaware No Drawing. Application September 1, 1943, Serial No. 500,848

11 Claims. (Cl. 260—94.9)

This invention relates to catalytic polymerization of olefines either alone or with other polymerizable compounds, and more particularly to conducting the catalytic polymerization in an organic polymerization medium.

It is known that solid polymers may be prepared by heating ethylene at controlled temperatures under superatmosphric pressures in the presence of catalysts, employing aqueous or organic polymerization media, or in the absence of a medium. Among the disadvantages of many ethylene polymers prepared by these processes are their low solubility and difficult extrudability, and also their heterogeneity, which imparts a haze or "grain" to extruded films. These properties are particularly critical for the preparation of unsupported films. Moreover, polymerization in the absence of a medium leads to a serious problem of temperature control. Similarly in the prepartion of polymers of ethylene with other polymerizable substances, temperature control is difficult if no medium is employed, and, if an aqueous medium is employed, hydrolyzable polymer ingredients may react with water. Hitherto, when olefin polymers have been prepared in organic solvents, the products were liquids or solids of relatively low molecular weight.

It is an object of this invention to provide a medium in which improved polymers can be prepared from olefins, alone or with other compounds containing a polymer-producing linkage. Another object is to provide an improved process for preparing, in improved yield, clear, tough ethylene polymers which have good melt extrusion characteristics, and markedly improved film and fiber forming properties.

These and other objects are accomplished in accordance with the present invention by polymerizing aliphatic monoolefins, alone or in the presence of other polymerizable materials, in a medium containing tertiary-butyl alcohol, and in the presence of polymerization catalysts or initiators. I have discovered that tertiary-butyl alcohol when used as a polymerization medium, influences in a surprising degree the properties of polymers made therein.

Among the aliphatic monoolefins which yield polymers are ethylene, propylene, isobutylene, and the like. Of these, ethylene is employed in the preferred embodiment of this invention. The compounds which may be polymerized with ethylene or other olefine, according to this invention, are ethenoid polymer-producing compounds which contain a double bond sufficiently reactive for polymerization. Among these, the preferred compounds contain a terminal methylene group doubly bonded to carbon as exemplified by vinyl and vinylidene type compounds. Preferred members of the vinyl compounds are styrene, vinyl esters, such as vinyl formate, vinyl benzoate, vinyl diethylacetate, vinyl acetate, vinyl trimethylacetate, vinyl propionate, vinyl butyrate, vinyl chloride, vinyl bromide, vinyl thiolacetate; vinyl ethers such as vinyl methyl ether, vinyl ethyl ether, vinyl phenyl ether, vinyl ethyl thioether; vinyl acetals as divinyl formal and divinyl butyral; vinyl ketones such as methyl vinyl ketone and ethyl vinyl ketone; other vinyl compounds such as the acrylic type compounds including acrylic acid, its esters as illustrated by methyl acrylate and ethyl acrylate, and acrylonitrile; and N-vinylamides and N-vinylimdes such as N-methylacrylamide, N-phenylacrylamide, N-vinylphthalimide.

Preferred members of the vinylidene compounds are vinylidene halides such as 1,1-dichloroethylene, 1-bromo-1-chloroethylene, 1-chloro-1-fluoroethylene; vinylidene ethers such as ketene acetal; alpha-substituted acrylic acids, esters, amides, and nitriles illustrated by methyl methacrylate, methyl alpha-chloroacrylate, methylene malonic ester, methylene malonamide, methacrylonitrile, and methylene malonitrile.

Still other polymer-producing ethenoid compounds are halides such as 1,2-dichloroethylene, and butendioic acid compounds, by which is meant butendioic acids or anhydrides, their esters and half esters such as dimethyl fumarate, diethyl fumarate, dimethyl maleate, diethyl maleate and methyl acid maleate.

Among the catalysts and initiators which are effective in the present invention and which are hereinafter referred to as polymerization catalysts, are molecular oxygen and per-oxygen compounds, including lauroyl peroxide, ammonium persulfate, sodium perborate, benzoyl peroxide, furoyl peroxide, dicamphoryl peroxide, diethyl peroxide, dimethyl peroxide, tertiary-butyl hydroperoxide, benzoperacid, furoperacid, camphor peracid, and acetoperacid; thermodecomposition products of organometallic compounds such as tetraethyl lead; hydrazinium compounds including hydrazine, hydrazine hydrochloride, semicarbazide hydrochloride, and alpha, alpha, alpha-trimethylhydrazinium iodide; perchloro compounds such as hexachloroethane and octachloropropane; and salts of aromatic sulfonamides such as the N-chloroaryl sulfonamides, exemplified by chloramine-T and chloramine-B.

Although the amount of polymerization catalyst may vary widely it is employed generally in proportions of from 0.001% to about 5% of the total weight of monomers. As a rule, the polymerization catalyst concentration is preferably in the range of about 0.17% to about 2% of the total reaction mixture.

In the preparation of polymers according to this invention, the reactants are generally heated in a pressure-resistant vessel at a temperature of from 20° to 400° C. and generally at 50° to 200° C. at a pressure in excess of atmospheric and suitably in the range 50 to 3000 atmospheres, or higher, in the presence of a polymerization catalyst and tertiary-butyl alcohol as a polymerization medium.

The following procedure will illustrate one method of practicing this invention. A pressure-resistant vessel is charged with tertiary-butyl alcohol, polymerization catalyst, ethylene and, if desired, another polymerizable organic compound other than ethylene, such as previously described. The vessel is closed in a rocker or shaker mechanism and while under 200 to 1500 atmospheres of ethylene pressure, the reaction mixture is agitated and heated at a temperature of 60 to 150° C. Though generally absent, there may be a brief induction period. After the reaction begins, it is allowed to continue until consumption of ethylene ceases as evidenced by cessation of pressure drop. The vessel is then cooled, excess of gases are bled off, and the polymer is separated from the contents by means well known to the art.

The vessel used in carrying out this invention must be fabricated of materials capable of withstanding the conditions of temperature and pressure employed. That portion of the equipment which comes into actual contact with the polymerization system should preferably be made from or lined with a material which does not corrode rapidly, or which will not affect the reactants. Suitable materials of construction as well as linings include glass, enamel, silver, aluminum, tin, so called "18–8" stainless steels (which contain 18–20% chromium and 8–14% nickel) nickel and manganese alloys containing high proportions of nickel.

The polymerization may be carried out batchwise, continuously or semi-continuously. Agitation may be provided, such as by the use of stirring or shaking machines in batchwise operation, or by the use of baffles in case of continuous operation or by turbulent flow in reactors having a high ratio of length to cross section.

This invention is further illustrated by the following specific examples, wherein parts are by weight unless otherwise stated.

*Example 1.*—A stainless steel pressure vessel is charged with 78 parts of tertiary-butyl alcohol and 0.2 part of chloramine-T (sodio-N-chloro-p-toluenesulfonamide) and the vessel is then closed, evacuated, and pressured to 300 atmospheres with ethylene. The vessel is agitated and heated at 146° to 150° C. for a period of 13.3 hours, during which time the pressure is maintained at 875 to 950 atmospheres by periodically injecting fresh ethylene. When the reaction is completed as indicated by cessation of pressure drop, the vessel is cooled, bled free of excess ethylene, opened and discharged. The polymer is freed of tertiary-butyl alcohol by steam distillation, and is dried under vacuum. There is obtained 14.2 parts of polymer which softens at 108° to 110° to a clear melt from which strong monofils can be spun readily. Hot-pressed films of this polymer are of unusual clarity and are found to have a tensile strength of 2675 pounds per square inch, and an elongation at break of 600%. This polymer is soluble to the extent of 30% by weight in refluxing xylene, an unusually high value for a tough, strong ethylene polymer. Films may be cast from such solutions and these are also found to possess unusual clarity and to have a high tear resistance.

*Example 2.*—A stainless steel reaction vessel is charged with 78 parts of tertiary-butyl alcohol, 0.2 part of chloramine-B (sodio-N-chloro-benzenesulfonamide) and is then evacuated and pressured to 200 atmospheres with ethylene. The vessel is placed in a rocker machine and heating and agitation are begun. During a reaction period of 7.75 hours, throughout which time the temperature is maintained at 188° to 191° C. and the pressure at 850 to 965 atmospheres by periodically injecting fresh ethylene, there is a total observed pressured drop of 285 atmospheres. At the end of the reaction, the vessel is cooled, bled free of excess ethylene and discharged. The polymer is freed of tertiary-butyl alcohol by distillation with steam and is dried under vacuum. There is obtained 38.2 parts of polymer. Hot-pressed films of this polymer are clear and free from grain.

*Example 3.*—A silver-lined pressure vessel is charged with 78 parts of tertiary-butyl alcohol and 0.3 part of diethyl dioxide. After evacuating and pressuring to 350 atmospheres with ethylene, the vessel is placed in a shaker machine and heating and agitation are begun. During the course of the ensuing reaction which requires 14 hours, the temperature is maintained at 129° to 132° C. and the pressure at 825 to 970 atmospheres by periodically injecting fresh ethylene. There is a total observed pressure drop of 1965 atmospheres. When the reaction is complete, as evidenced by cessation of pressure drop, the vessel is cooled, bled free of excess ethylene, opened and the product is discharged. After removal of tertiary-butyl alcohol, followed by drying, there is obtained 148 parts of ethylene polymer which softens at 100° C. The solubility of this polymer in refluxing xylene is found to be greater than 10% and hot-pressed or solvent-cast films are clear and free from grain. The relative viscosity of a 0.5% solution in xylene at 85° C. is found to be 1.39 from which it may be calculated that the intrinsic viscosity is 0.66. The yield of polymer per part of catalyst is 493 parts.

*Example 4.*—A stainless steel pressure-resistant vessel is charged with 78 parts of tertiary-butyl alcohol and 0.4 part of benzoyl peroxide. The vessel is evacuated, pressured to 600 atmospheres with ethylene, placed in a heated rocker machine and heating and agitation are started. After a brief induction period, the reaction begins and over a period of 10.5 hours, during which time the pressure is maintained at 820 to 950 atmospheres by periodically repressuring with ethylene at 72° to 81° C., there is a total observed pressure drop of 310 atmospheres. When the reaction is complete, as evidenced by cessation of pressure drop, the vessel is cooled, the excess ethylene is bled off and the product is discharged. The tertiary-butyl alcohol is washed out with methanol and the polymer is dried under vacuum. The yield of dry product obtained in this manner is 31 parts. Hot-pressed films of this polymer are found to have a tensile strength of 2210 pounds per square inch, and an elongation at break of 150%. The melt extrusion rate of a plug of this polymer ½" in diameter through a $\frac{1}{16}$" orifice under 125 pounds per square inch nitrogen pressure at 190° C. is 0.216 gram per minute.

*Example 5.*—A stainless steel high-pressure vessel is charged with 100 parts of tertiary-butyl alcohol, 20 parts of N-vinylphthalimide, and 0.3 part of diethyl dioxide. The vessel is closed, evacuated, placed in a heated shaker machine, pressured to 300 atmospheres with ethylene and heating and agitation are started. During a reaction time of 16.5 hours, throughout which the temperature is maintained at 128 to 130° C. and the pressure at 760 to 955 atmospheres, there is a total observed pressure drop of 180 atmospheres. At the end of the reaction, the vessel is cooled, bled free of excess ethylene, opened and the contents discharged. The crude reaction mixture, amounting to 105 parts, is steam distilled to separate the tertiary-butyl alcohol and volatilize the major portion of the unreacted N-vinyl-phthalimide. The polymer is then dried on a smooth roll mill. There is obtained 22 parts of strong elastomeric polymer of ethylene and N-vinylphthalimide. This polymer contains 4.4% nitrogen, from which it may be calculated that the ethylene/N-vinyl phthalimide mole ratio is 5.3:1. The polymer is soluble in tetrachloroethylene and xylene to about 10%, soluble in hot butyl acetate, but is relatively insoluble in cold butyl acetate. Films may be pressed at 95° to 100° C. and these are found to have a tensile strength of 1530 pounds per square inch and an elongation of 380% at the break point.

*Example 6.*—A stainless steel lined high-pressure reaction vessel is charged with 100 parts of tertiary-butyl alcohol, 10 parts of vinyl thiolacetate, and 0.3 part of diethyl dioxide. An ethylene pressure of 855 atmospheres is imposed on the mixture. During a reaction period of 15.2 hours, throughout which the temperature is maintained at 100° to 105° C. and the ethylene pressure at 855 to 960 atmospheres, there is a total observed pressure drop of 360 atmospheres. The reaction mixture yields 31 parts of ethylene/vinyl thiolacetate polymer. This is a low-softening, somewhat waxy polymer and contains 8.8% sulfur. From the sulfur content, it may be calculated that the polymer has an ethylene/vinyl thiolacetate mole ratio of 9.3:1.

*Example 7.*—A stainless steel lined high-pressure reaction vessel is charged with 100 parts of tertiary-butyl alcohol, 20 parts of vinyl thiolacetate, and 0.3 part of diethyl dioxide. Ethylene under 875 atmospheres pressure is imposed on the mixture. During a reaction time of 17.25 hours, throughout which the temperature is maintained at 98° to 104° C. and the pressure at 875 to 990 atmospheres by periodically repressuring with ethylene, there is a total observed pressure drop of 175 atmospheres. This reaction mixture yields 19 parts of a tacky, coherent wax which has an intrinsic viscosity of 0.20 (as measured on a 0.5% solution in xylene at 85° C.) and contains 17.2 sulfur. From the sulfur content, it may be calculated that the polymer has an ethylene/vinyl thiolacetate mole ratio of 3:1.

*Example 8.*—A silver lined pressure resistant vessel is charged with 78 parts of tertiary-butyl alcohol, 20 parts of dimethyl fumarate and 0.2 part of benzoyl peroxide. An ethylene pressure of 850 atmospheres is imposed. Over a reaction period of 8.0 hours, during which time the temperature is maintained at 64° to 67° C. and the pressure at 850 to 930 atmospheres by periodically repressuring with ethylene, there is a total observed pressure drop of 140 atmospheres. At the end of the reaction, the vessel is cooled, bled free of excess ethylene, opened and the contents, amounting to 71 parts, discharged. The solvent is removed by steam distillation and the polymer thus obtained is dried on a smooth roll mill at 100° C. There is obtained 24 parts of a clear, tough, homogeneous ethylene/dimethyl fumarate polymer which is soluble in common organic solvents such as ethyl alcohol, ethyl acetate, acetone, chloroform and xylene. The carbon content is found to be 56.6% from which it may be calculated that ethylene/dimethyl fumarate mole ratio is 1.2:1. The relative viscosity of a 0.5% solution in xylene at 85° C. is found to be 1.177 from which it may be calculated that the intrinsic viscosity is 0.33. Films, which may be pressed at 95° to 100° C., are found to have a tensile strength of 2390 pounds per square inch and an elongation of 324% at the break point.

*Example 9.*—A stainless steel pressure resistant vessel is charged with 78 parts tertiary-butyl alcohol, 20 parts diethyl fumarate and 0.3 part of benzoyl peroxide. The vessel is closed, evacuated, placed in a heated rocker machine and ethylene is introduced to a pressure of 270 atmospheres. Heating and agitation are started and when the temperature reaches 75° C. the pressure is 350 atmospheres. The pressure is then increased to 520 atmospheres by introduction of more ethylene. Reaction begins after a brief induction period and over a period of 6.1 hours, during which time the temperature is maintained at 65° to 69° C. and the pressure at 490 to 600 atmospheres by periodically repressuring with ethylene, there is a total observed pressure drop of 180 atmospheres. At the end of the reaction, the vessel is cooled, bled free of excess gas and discharged. The reaction mixture consisting of 57 parts is distilled with steam to remove tertiary-butyl alcohol and the polymer is dried on a steam bath under reduced pressure. The ethylene/diethyl fumarate polymer thus obtained, amounting to 22 parts, is a clear, pliable elastomer. The carbon content is 65.2%, from which it may be calculated that the ethylene-diethyl fumarate mole ratio is 2.8:1. The relative viscosity of 0.5% solution in xylene at 85° C. is 1.359 from which it may be calculated that the intrinsic viscosity is 0.62.

*Example 10.*—A silver lined pressure resistant vessel is charged with 35 parts of methyl methacrylate, 59 parts of tertiary-butyl alcohol and 0.5 part of diethyl dioxide. The vessel is closed, evacuated, pressured with ethylene to 500 atmospheres, and placed in a shaker machine after which heating and agitation are begun. Over a period of 9.25 hours, during which time the temperature is maintained at 98° to 104° C. and the pressure from 880 to 950 atmospheres by periodically repressuring with ethylene, there is a total observed pressure drop of 140 atmospheres. At the end of the reaction the vessel is cooled, bled free of excess gas, opened and discharged. The reaction mixture, consisting of 90 parts, is distilled with steam and the polymer is removed and dried on a smooth roll mill at 100° C. There is obtained 32 parts of a hard, tough ethylene/methyl methacrylate polymer which is soluble in hydrocarbon solvents and contains 63.1% carbon, from which it may be calculated that the ethylene/methyl methacrylate mole ratio is 1:2.1. The relative viscosity of 0.5% solution of the polymer in xylene at 85° C. is 1.346 for which it may be calculated that the intrinsic viscosity is 0.6. Films may be pressed at a temperature of 95° to 100° C. and these are found to have a tensile strength of 3800 pounds per square inch and an elongation of 180% at the break point. The impact strength of a molded test bar of this polymer is found to be 0.48 pound per inch notch, as determined by the A. S. T. M. test.

*Example 11.*—A stainless steel pressure resistant vessel is charged with 5 parts of methyl methacrylate, 67 parts of tertiary-butyl alcohol, and 0.2 part of diethyl dioxide, the vessel is closed, evacuated, pressured with ethylene to 500 atmospheres, placed in a shaking machine, and heating and agitation are begun. Over a reaction period of 7.5 hours, during which time the temperature is maintained at 100 to 101° C. and the pressure at 860 to 950 atmospheres by periodically repressuring with ethylene, there is a total observed pressure drop of 160 atmospheres. The polymer is isolated from the reaction mixture by distillation of volatile matter with steam and is dried on a smooth roll mill at 100° C. There is obtained 9.5 parts of a clear-pliable ethylene/methyl methacrylate polymer which contains 76.1% carbon, from which it may be calculated that the ethylene/methyl methacrylate mole ratio is 5.8:1. The relative viscosity of 0.5% solution in xylene at 85° C. is 1.597 from which it may be calculated that the intrinsic viscosity is 0.96. A film pressed from this polymer at a temperature of 95 to 100° C. is found to have a tensile strength of 1370 pounds per square inch and an elongation of 700% at the break point. This polymer is readily soluble in hot hydrocarbon solvents such as xylene.

*Example 12.*—A stainless steel pressure vessel is charged with 25 parts of methyl methacrylate, 59 parts of tertiary-butyl alcohol and 0.2 part of chloroamine-T (sodio-N-chloro-p-toluenesulfonamide). The vessel is evacuated, pressured with ethylene to 350 atmospheres, placed in a rocker machine and heating and agitation are begun. The total observed pressure drop over reaction period of 9.25 hours, during which the temperature is maintained at 135° to 138° C. and the pressure at 865 to 950 atmospheres by periodically repressuring with ethylene, is 330 atmospheres. At the end of the reaction the vessel is cooled, bled free of excess ethylene, opened, and the product is discharged. The tertiary-butyl alcohol is removed by distillation with steam, after which the polymer is dried on a smooth roll mill at 100° C. There is obtained 15 parts of a tough, clear, homogeneous ethylene/methyl methacrylate polymer having a carbon content of 64.5% from which it may be calculated that ethylene/methyl methacrylate mole ratio is 1.2:1, the relative viscosity of a 0.5% solution in xylene at 85° C. is 1.256, from which it is calculated that the intrinsic viscosity is 0.36. Films may be pressed at about 85° C. and these are found to have a tensile strength of 2070 pounds per square inch, and an elongation of 180% at the break point.

*Example 13.*—A stainless steel pressure vessel is charged with 320 parts of vinyl acetate, 273 parts of tertiary-butyl alcohol and 0.6 part of benzoyl peroxide. The vessel is closed, evacuated, pressured with ethylene to 175 atmospheres, and placed in a heated rocker machine. Heating and agitation are begun and over a reaction period of 14 hours, during which time the temperature is maintained at 63° to 66° C. and the pressure at 210 to 280 atmospheres by periodically repressuring with ethylene, there is a total observed pressure drop of 205 atmospheres. When the pressure ceases to fall the vessel is cooled, bled free of excess gas, opened and discharged. The ethylene/vinyl acetate polymer is freed of tertiary-butyl alcohol and dried. There is obtained 90 parts of a polymer having carbon content of 67% from which it may be calculated that the ethylene/vinyl acetate mole ratio is 1.8:1. The relative viscosity of 0.5% solution in meta-cresol at 25° C. is 1.651 from which it may be calculated that the intrinsic viscosity is 1.04. The hydrolyzed polymer draws to a smooth filament when heated in a flame, which indicates good spinnability.

*Example 14.*—A silver lined pressure vessel is charged with 50 parts of styrene, 59 parts of tertiary-butyl alcohol and 0.5 part of diethyl dioxide. The vessel is closed, evacuated, pressured with ethylene to 50 atmospheres and placed in a heated rocker machine. Heating and agitation are started and during a reaction period of 9 hours the temperature is maintained at 199° to 201° C. and the pressure at 860 to 970 atmospheres by periodically repressuring with ethylene. The total observed pressure drop is 275 atmospheres. The vessel is then cooled, bled of excess ethylene, opened, and discharged. The reaction mixture, amounting to 113 parts, is distilled with steam to remove tertiary-butyl alcohol and any unreacted styrene. The product is then dried on a smooth roll mill at 100° C. There is obtained 57 parts of a white, pliable ethylene/styrene polymer melting at 40° to 45° C. and having a carbon content of 89.9%, from which it may be calculated that ethylene/styrene mole ratio is 1.8:1. The intrinsic viscosity of the polymer, as calculated from measurements of the relative viscosity of 0.5% solution in xylene at 85° C. is 0.10. The polymer is easily soluble in xylene, toluene, benzene, cyclohexane and ethylene dichloride but is insoluble in isooctane. It readily undergoes nitration with nitric acid and sulfonation with chlorosulfonic acid to give nitro- and sulfonic-acid-containing derivatives.

It is to be understood that when ethylene is specified in the foregoing examples, a substantially pure ethylene is meant, although minor percentages of impurities, frequently found in ethylene, may be present, without departing from the principle of this invention. A concentration of oxygen up to 200 parts per million in the ethylene may be tolerated, but higher concentration of oxygen results in decreased yields. Preferably the oxygen concentration should be below 50 parts per million.

The process described in the specification refers to polymerization of the olefin, such as ethylene, either alone or with other polymerizable organic compounds containing at least one polymer producing linkage.

Having thus described our invention, we claim:

1. A process for the preparation of normally solid ethylene polymers which comprises heating ethylene with a mixture containing 78 parts by weight of tertiary butyl alcohol and 0.2 part of sodio-N-chloro-p-toluenesulfonamide, at a temperature of 146° to 150° C., under a pressure of 875 to 950 atmospheres, for a period of 13.3 hours, whereby a strong, tough ethylene polymer, characterized by being soluble in boiling xylene to the extent of about 30% by weight, is obtained.

2. A process for preparing normally solid polymers which comprises heating ethylene in tertiary butyl alcohol at a temperature within the range of 20° to 400° C., under a pressure within the range of 50 to 3000 atmospheres in the presence of 0.001% to 5.0% of a catalyst of the class consisting of peroxy compounds, oxygen, hydrazinium compounds and N-chloro arylsulfonamides, based on the total weight of monomer, whereby polymerization occurs, and thereafter separating from the resultant reaction mixture the normally solid polymer obtained by the said polymerization.

3. A process for preparing normally solid polymers which comprises heating ethylene in tertiary butyl alcohol at 50° to 200° C. under 200 to 1500 atmospheres pressure in the presence of 0.001% to 5.0% by weight, of a peroxy compound, based on the weight of monomer.

4. A process for preparing normally solid polymers which comprises heating ethylene, as the sole polymerizable reactant, in tertiary butyl alcohol at 50° to 200° C. under 200 to 1500 atmospheres pressure in the presence of 0.001% to 5.0% by weight, of a peroxy compound, based on the weight of ethylene.

5. A process for preparing a normally solid polymer which comprises heating ethylene with methyl methacrylate in tertiary butyl alcohol at 50° to 200° C. under a pressure of 200 to 1500 atmospheres in the presence of 0.001% to 5.0% by weight of a peroxy compound, based on the total weight of monomers present.

6. A process for preparing a normally solid polymer which comprises heating ethylene with a compound of the formula ROOCCH=CHCOOR, R being a member of the class consisting of hydrogen, methyl, and ethyl groups, in tertiary butyl alcohol at 50° to 200° C. under a pressure of 200 to 1500 atmospheres in the presence of 0.001% to 5.0% by weight of a peroxy compound, based on the total weight of the monomers present.

7. A process for preparing normally solid polymers which comprises heating ethylene in tertiary butyl alcohol at a temperature within the range of 50° to 200° C. under a pressure within the range of 200 to 1500 atmospheres in the presence of 0.001% to 5.0% by weight, based on the weight of the monomer, of a polymerization catalyst of the class consisting of peroxy compounds, oxygen, hydrazinium compounds, and N-chloro arylsulfonamides.

8. A process for preparing normally solid interpolymers which comprises heating ethylene with a polymerizable vinyl compound, in tertiary butyl alcohol, at a temperature within the range of 50 to 200° C., under a pressure within the range of 200 to 1500 atmospheres, in the presence of 0.001% to 5.0% by weight of a polymerization catalyst of the class consisting of peroxy compounds, oxygen, hydrazinium compounds, and N-chloro arylsulfonamides.

9. A process for preparing normally solid interpolymers which comprises heating ethylene with a compound of the formula

ROOCCH=CHCOOR

R being a member of the class consisting of hydrogen, methyl and ethyl groups, in tertiary butyl alcohol, at a temperature within the range of 50 to 200° C., under a pressure within the range of 200 to 1500 atmospheres, in the presence of 0.001% to 5.0% by weight of a polymerization catalyst of the class consisting of peroxy compounds, oxygen, hydrazinium compounds, and N-chloro arylsulfonamides.

10. A process for preparing normally solid interpolymers which comprises heating ethylene with a polymerizable vinylidene compound, in tertiary butyl alcohol, at a temperature within the range of 50 to 200° C., under a pressure within the range of 200 to 1500 atmospheres, in the presence of 0.001% to 5.0% by weight of a polymerization catalyst of the class consisting of peroxy compounds, oxygen, hydrazinium compounds, and N-chloro arylsulfonamides.

11. The process of claim 10 in which the polymerizable vinylidene compound is methyl methacrylate.

DONALD EDWARD SARGENT.
WILLIAM EDWARD HANFORD.

REFERENCES CITED

The following references are of record in the file of this patent:

UNITED STATES PATENTS

| Number | Name | Date |
| --- | --- | --- |
| 2,334,195 | Hopff | Nov. 16, 1943 |
| 2,373,561 | Hanford | Apr. 10, 1945 |
| 2,391,920 | Peterson | Jan. 1, 1946 |
| 2,392,585 | Fryling | Jan. 8, 1946 |
| 2,414,311 | Larson | Jan. 14, 1947 |